(12) United States Patent
Lee et al.

(10) Patent No.: US 12,399,529 B2
(45) Date of Patent: Aug. 26, 2025

(54) WEARABLE DEVICE

(71) Applicant: AMOGREENTECH CO., LTD., Gimpo-si (KR)

(72) Inventors: Seung Min Lee, Gimpo-si (KR); Seung Yun Rho, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 218 days.

(21) Appl. No.: 18/257,978

(22) PCT Filed: Dec. 3, 2021

(86) PCT No.: PCT/KR2021/018193
§ 371 (c)(1),
(2) Date: Jun. 16, 2023

(87) PCT Pub. No.: WO2022/131640
PCT Pub. Date: Jun. 23, 2022

(65) Prior Publication Data
US 2024/0053794 A1 Feb. 15, 2024

(30) Foreign Application Priority Data
Dec. 17, 2020 (KR) .................. 10-2020-0177515

(51) Int. Cl.
*G06F 1/16* (2006.01)
*G06T 19/00* (2011.01)
(Continued)

(52) U.S. Cl.
CPC ............ *G06F 1/163* (2013.01); *G06T 19/006* (2013.01); *H01M 50/207* (2021.01);
(Continued)

(58) Field of Classification Search
None
See application file for complete search history.

(56) References Cited

U.S. PATENT DOCUMENTS 9,733,480 B2  8/2017  Baek et al.
10,564,433 B2 * 2/2020  Lee .................. A63B 33/002
(Continued)

FOREIGN PATENT DOCUMENTS

JP  2017229048 A  12/2017
KR  20160026557 A  3/2016
(Continued)

OTHER PUBLICATIONS

International Search Report issued in PCT/KR2021/018193 dated Mar. 17, 2022, 4 pgs.

*Primary Examiner* — Allen L Parker
*Assistant Examiner* — Elisa Sasserath
(74) *Attorney, Agent, or Firm* — ROTHWELL, FIGG, ERNST & MANBECK, P.C.

(57) ABSTRACT

Provided is a wearable device. A wearable device according to an exemplary embodiment of the present invention comprises: a main body part including a display unit for augmented reality or virtual reality; a wearing part for maintaining the worn state of the main body part so that the display unit can be disposed on a user's face; a battery part coupled to the wearing part and including a first battery that serves as a main battery providing driving power to the main body part, and a second battery that serves as an auxiliary battery supporting the first battery; and an operation part provided in the wearing part to enable the removal of the second battery from the wearing part during a user's operation.

7 Claims, 7 Drawing Sheets (51) Int. Cl.
*H01M 50/207* (2021.01)
*H01M 50/247* (2021.01)
*H01M 50/271* (2021.01)

(52) U.S. Cl.
CPC ....... *H01M 50/247* (2021.01); *H01M 50/271* (2021.01); *H01M 2220/30* (2013.01)

(56) References Cited

U.S. PATENT DOCUMENTS

| | | | |
|---|---|---|---|
| 10,580,383 B2 * | 3/2020 | Jiang | G02B 27/0176 |
| 10,614,745 B2 * | 4/2020 | Lee | G09G 3/3266 |
| 10,660,224 B2 * | 5/2020 | Wen | G02B 27/0176 |
| 10,774,987 B2 * | 9/2020 | Xu | G06F 3/011 |
| 2015/0253574 A1 * | 9/2015 | Thurber | G02B 27/0172 |
| | | | 359/630 |
| 2016/0062125 A1 * | 3/2016 | Baek | H05K 5/0086 |
| | | | 361/679.01 |
| 2016/0357250 A1 | 12/2016 | Kim et al. | |
| 2020/0343775 A1 * | 10/2020 | Yahagi | H02J 50/12 |

FOREIGN PATENT DOCUMENTS

| | | | |
|---|---|---|---|
| KR | 1020160141982 A | 12/2016 | |
| KR | 20170136342 A | 12/2017 | |
| KR | 1020180109669 A | 10/2018 | |
| WO | 2017/123017 A1 | 7/2017 | |

* cited by examiner

WEARABLE DEVICE

CROSS REFERENCE TO RELATED APPLICATION

This application is a 35 U.S.C. 371 National Phase Entry Application from PCT/KR2021/018193 filed Dec. 3, 2021, which claims priority to and the benefit of Korean Patent Application No. 10-2020-0177515, filed on Dec. 17, 2020, the disclosures of which are incorporated herein by reference in their entirety.

TECHNICAL FIELD

The present invention relates to a wearable device.

BACKGROUND ART

Recently, with the development of electronic technology, various means for displaying visual information to a user have been developed. As part of this, a display device that can be worn on a user's head is being developed.

For example, a head mounted display (HMD) device is a display device capable of displaying visual information while worn on a user's head. Such an HMD device includes a virtual reality device that shows a virtual reality world through a display unit disposed at a position corresponding to the user's eyes when worn, an augmented reality device that shows an augmented screen together with a real world through the display unit, and the like.

The HMD device requires a driving power to drive the display unit. To this end, the HMD device receives the driving power from a commercial power source through a power cable or from a battery built into the device itself.

However, since the method of using the commercial power supplied through the power cable as the driving power restricts the user's activity, the method of embedding the battery in the device itself is used as the main method of providing the driving power.

Accordingly, in order for the user to use the HMD device for a long time, a battery having a high storage capacity needs to be mounted on the HMD device. However, as the storage capacity of the battery increases, its size also increases. Therefore, since additional space is required to mount a larger capacity battery inside the HMD device, the overall size of the HMD device is also bound to increase.

In addition, since the degree of freedom in design decreases when the space for mounting the battery increases, the diversity of design is inhibited.

DISCLOSURE

Technical Problem

The present invention has been devised in view of the above points, and an object of the present invention is to provide a wearable device capable of implementing a reduction in weight and diversification of design even while increasing battery capacity.

Technical Solution

In order to solve the above problems, the present invention provides a wearable device comprising: a body part including a display unit for augmented reality or virtual reality; a wearing part for maintaining a worn state of the body part so that the display unit can be disposed in front of a user's face; a battery part coupled to the wearing part and including a first battery serving as a main battery providing driving power to the body part and a second battery serving as an auxiliary battery supplementing the first battery; and an operation part provided in the wearing part to allow the second battery to be separated from the wearing part when operated by a user.

In addition, the wearing part may include a frame formed in a ring shape to surround the user's head, and the frame may include: an arc-shaped first frame having one side connected to the body part and to which the first battery is coupled, an arc-shaped second frame in which both ends are respectively fastened to ends of the first frame and the operation part is provided, and an accommodation groove formed in the second frame to accommodate the second battery.

In addition, the wearable device may further include a holder member in which the second battery is embedded, and the holder member may be detachably coupled to the accommodation groove.

In addition, the wearable device may further include a cover member coupled to the first frame to protect the first battery disposed on one surface of the first frame from an external environment.

Further, the body part may not include a battery for driving power.

In addition, the wearing part may further include a plate-shaped support member coupled to the first frame, and the support member may be formed in a curved surface having a predetermined area to partially surround the user's head.

In addition, each of the first battery and the second battery may be a flexible battery having flexibility.

In this case, the flexible battery may include: an electrode assembly; an exterior material to encapsulate the electrode assembly together with an electrolyte; a first pattern formed in the electrode assembly such that mountain portions and valley portions are repeatedly arranged along the longitudinal direction of the electrode assembly; and a second pattern formed in the exterior material to coincide with the second pattern along the longitudinal direction of the exterior material.

Advantageous Effects

According to the present invention, the overall weight can be reduced by using a thin flexible battery having a relatively light weight per storage capacity as a driving power source.

In addition, according to the present invention, some of the batteries can be detachably coupled to the wearing part. Accordingly, when the power is completely exhausted in the wearable device according to an embodiment of the present invention, some of the batteries can be easily replaced, thereby increasing the usage time.

MODES OF THE INVENTION

Hereinafter, with reference to the accompanying drawings, embodiments of the present invention will be described in detail so as to be easily implemented by one of ordinary skill in the art to which the present invention pertains. The present invention may be embodied in a variety of forms and is not be limited to the embodiments described herein. In order to clearly describe the present invention in the drawing, parts irrelevant to the description are omitted from the drawings; and throughout the specification, same or similar components are referred to as like reference numerals.

An wearable device 100 according to an embodiment of the present invention may be a head mounted display (HMD) device for implementing a visual virtual reality or augmented reality.

When the wearable device 100 is worn on a user's head, a display unit 112 may be disposed at a position corresponding to the user's eyes, and the user may check various information or images displayed through the display unit 112.

To this end, as shown in FIGS. 1 to 4, the wearable device 100 according to an embodiment of the present invention may include a body part 110, a wearing part 120, a battery part 130a and 130b, and an operation part 140.

When the user wears the wearable device 100 on the head through the wearing part 120, the body part 110 may be disposed at a position corresponding to the user's eyes.

Such a body part 110 may provide various image information to the user.

Figure 1:
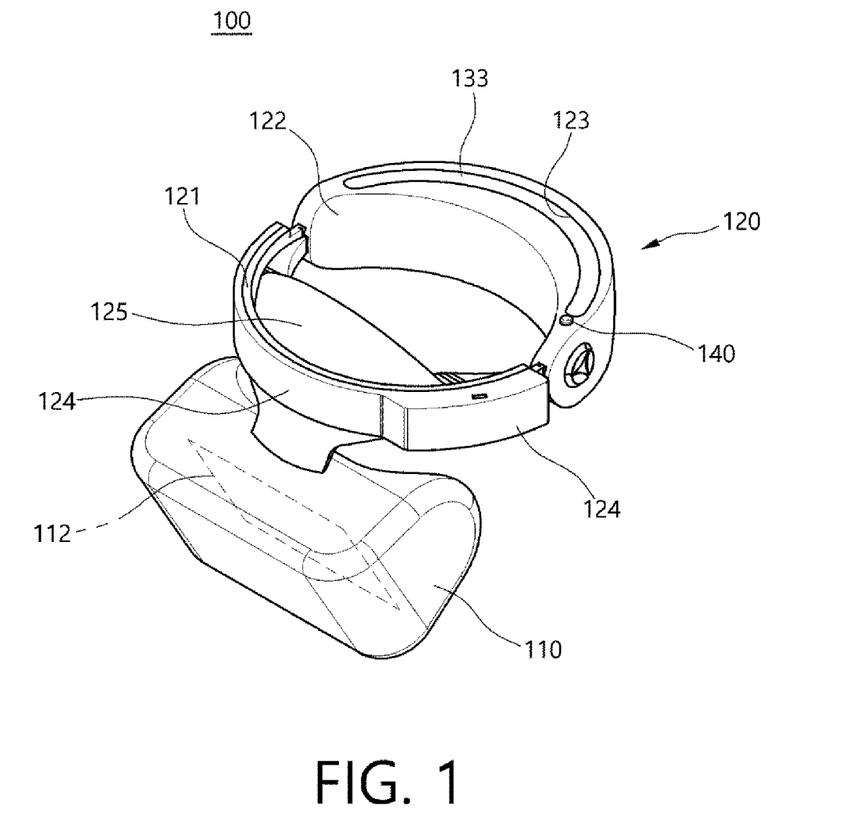
FIG. 1 is a view showing a wearable device according to an embodiment of the present invention.

To this end, as shown in FIG. 1, the body part 110 may include a display unit 112 for displaying various image information, and a control part for controlling an operation of the display unit 112.

Herein, the control part may be a microprocessor, and the display unit 112 may be an augmented reality display on which augmented reality is output, or a virtual reality display on which virtual reality is output.

Further, the display unit 112 may be a transparent organic light emitting display.

Accordingly, the user may experience through the display unit 112 the augmented reality in which a real world viewed through the transparent organic light emitting display is overlapped with information or images output through the transparent organic light emitting display, or the virtual reality that imitates a specific environment or situation in reality as it is and makes the user seem to interact with the real surrounding situation or environment.

Meanwhile, the body part 110 may further include other functional modules for performing various functions in addition to the display unit 112. For example, the body part 110 may further include at least one of: a communication module for wirelessly transmitting and receiving data, various sensor modules for detecting the user's gestures, movements, temperature, speed, etc., a camera module for obtaining image information around the user, a microphone module and a speaker module.

In addition, the body part 110 may further include a data storage unit for storing information obtained through the above-described functional modules, and a USB port for connection with an external storage medium.

As described above, when the user wears the wearable device 100 according to an embodiment of the present invention, the wearing part 120 may fix the body part 110 so that it is located in front of the user's face.

For example, the wearing part 120 may be provided as a frame formed in a ring shape to surround the user's head when the wearable device 100 is worn.

As a non-limiting example, the frame may include an arc-shaped first frame 121 having one side connected to the body part 110, and an arc-shaped second frame having both ends fastened to ends of the first frame 121, respectively, and the first frame 121 and the second frame 122 may be disposed to be convex in opposite directions.

Accordingly, the frame may be formed in a ring shape by combining the first frame 121 and the second frame 122, and when the wearable device is worn, one surface of each of the first frame 121 and the second frame 122 facing each other may surround the user's head while being in contact with the user's head.

Accordingly, when the user wears the wearable device 100 according to an embodiment of the present invention, the wearing part 120 may surround the user's head, and the body part 110 connected to one side of the first frame 121 may be disposed to locate in front of the user's face.

Herein, both ends of the second frame 122 may be fixedly coupled to the ends of the first frame 121, but may be rotatably coupled to the first frame 121.

In this case, the wearable device 100 according to an embodiment of the present invention may be prevented from flowing downward and releasing the worn state while the wearing part 120 is disposed to surround the user's head.

To this end, the wearing part 120 may further include a plate-shaped support member 125 coupled to the first frame 121. Such a support member 125 may be provided to have a predetermined area to partially surround the user's head, and may be formed in a curved surface so as to be in close contact with the user's head.

Accordingly, when the user wears the wearable device 100 according to an embodiment of the present invention, the first frame 121 and the second frame 122 may surround the user's head, and the support member 125 may be in contact with the upper portion of the user's head. Therefore, the support member 125 may prevent the first frame 121 and the second frame 122 from flowing downward while being worn on the user's head.

The battery part 130a and 130b may serve as a power supply source for supplying driving power to the body part 110.

That is, the battery part 130a and 130b may provide the driving power to a control part (not shown) built in the body part 110, so that various functional modules including the display unit 112 contained in the body part 110 may be driven under the control of the control part.

Such a battery part 130a and 130b may be embedded in the wearing part 120 to prevent the weight from being concentrated on the body part 110 disposed in front of the user's face when the wearable device 100 according to an embodiment of the present invention is worn, and may be configured as a flexible battery so as to have high capacity while reducing the overall weight.

That is, in the wearable device 100 according to an embodiment of the present invention, the battery part 130a and 130b serving as a power supply source is not built into the body part 110, but may be embedded in the wearing part 120 surrounding the user's head so that the worn state of the body part 110 may be maintained.

For example, the battery part 130a and 130b may be provided with at least one flexible battery and be coupled to the wearing part 120 so as to be disposed along the longitudinal direction of the first frame 121 and/or the second frame 122 constituting the wearing part 120.

Accordingly, in the wearable device 100 according to an embodiment of the present invention, the weight of the body part 110 itself may be reduced by the weight of the omitted battery, whereby the user's body may be prevented from being tilted forward by the weight of the body part 110 even when the user wears the wearable device 100. Further, the total weight of the wearable device 100 may be shared because the weight of the wearing part 120 itself may be increased by the weight of the added battery.

In addition, in the wearable device 100 according to an embodiment of the present invention, since the battery part 130a and 130b is disposed in the wearing part 120, the body part 110 may not require a separate space for embedding a battery. Accordingly, since the total size of the body part 110 may be reduced, the wearable device 100 according to an embodiment of the present invention may be implemented with a miniaturization or thinness.

In addition, since the mounting space of the battery is omitted in the body part 110, the internal space of the body part 110 may be usefully utilized if the size of the body part is kept the same as in the prior art. Accordingly, other additional functional modules in addition to the aforementioned functional modules may be further included in the internal space of the body part 110.

In addition, the wearable device 100 according to an embodiment of the present invention may use, as a power supply source, a flexible battery having a relatively light weight per storage capacity instead of a prismatic battery having a relatively heavy weight per storage capacity, thereby reducing the overall weight of the device and implementing a reduction in weight.

In this case, the battery part 130a and 130b may be provided with a single flexible battery, but may be provided with a plurality of flexible batteries to increase the total capacity. In addition, at least one flexible battery may be detachably coupled to the wearing part 120 so that the battery part 130a and 130b may be continuously used through simple replacement even when the battery power is exhausted.

For example, the battery part 130a and 130b may include a first battery 130a serving as a main battery providing driving power to the body part 110 and a second battery 130b serving as an auxiliary battery supplementing the first battery 130a, and the second battery 130b may be detachably coupled to the wearing part 120, and the second battery 130b may be easily separated from the wearing part 120 by a user's manipulation.

Herein, the first battery 130a and the second battery 130b may be provided as a flexible battery as described above, and the flexible battery may be a plate-shaped flexible battery having a predetermined area and length. In addition, each of the first battery 130a and the second battery 130b may further include separate circuit units 152 and 153 for controlling charging/discharging or preventing overcharging. A detailed description of such a flexible battery will be provided later.

Accordingly, when the power of the battery part 130a and 130b is partially or completely exhausted, the user may replace the second battery 130b through a simple manipulation to provide driving power to the first battery 130a. Accordingly, the body part 110 may be continuously driven.

To this end, the wearing part 120 may include an accommodation groove 123 for accommodating the second battery 130b, and the second battery 130b may be detachably coupled to the accommodation groove 123. In addition, the wearable device 100 may include a operation part 140 provided in the wearing part 120 so that the second battery 130b mounted in the accommodation groove 123 may be easily separated from the accommodation groove 123 by a user's manipulation.

Figure 2:
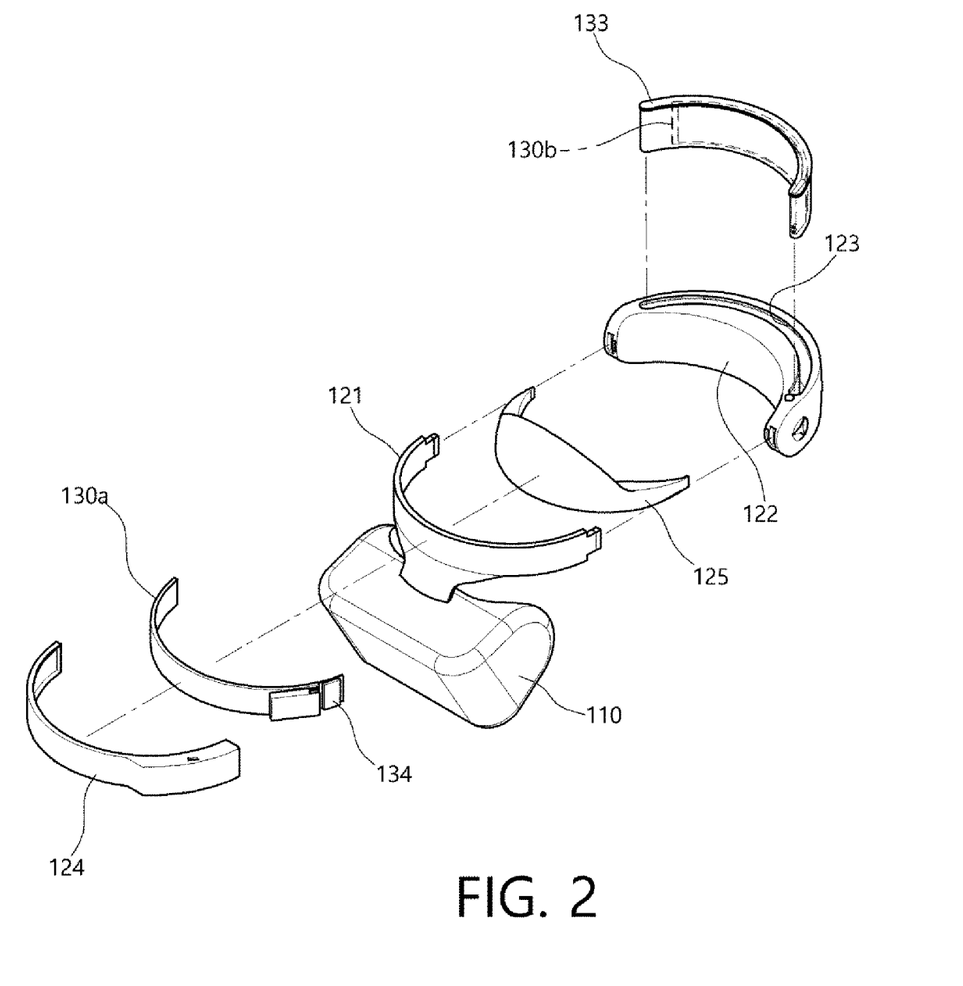
FIG. 2 is an exploded view of FIG. 1.

As a non-limiting example, as shown in FIG. 2, the second frame 122 may include an accommodation groove 123 formed along the longitudinal direction, and the operation part 140 may be provided in the second frame 122 so as to be positioned around an edge defining the accommodation groove 123.

In addition, the accommodation groove 123 may be formed to be recessed inwardly from an upper surface of the second frame 122 by a predetermined depth so that the upper portion thereof is opened, and the operation part 140 may be provided as a button capable of being pressed by a user on one surface of the second frame 122.

In this case, as shown in FIGS. 1 and 2, the first battery 130a may be disposed on one surface of the first frame 121 along the longitudinal direction of the first frame 121, and the second battery 130b may be inserted into the accommodation groove 123.

In this case, the first battery 130a may be disposed on one surface of the first frame 121 via a cover member 124 coupled to one surface of the first frame 121, and may be electrically connected to the body part 110.

In addition, the second battery 130b may be detachably coupled to the accommodation groove 123 in a state of being coupled to a holder member 151.

Herein, the second battery 130b may be formed integrally with the holder member 151 or may be detachably coupled to one side of the holder member 151.

In addition, the holder member 151 may be formed of a material having rigidity so that a shape substantially similar to that of the accommodation groove 123 may be maintained, but may also be formed of a soft material having flexibility.

In addition, the holder member 151 may be electrically connected to the first battery 130a while being inserted into the accommodation groove 123. To this end, the holder member 151 may include a connection terminal exposed to the outside so as to be electrically connected to the second battery 130b, and the connection terminal may be in contact with a corresponding connection terminal provided inside the accommodation groove 123. For example, any one of the connection terminal and the corresponding connection terminal may be a known pogo pin.

Accordingly, the first battery 130a may be prevented from being exposed to the outside by the cover member 124, and may serve as a main battery for providing driving power to the body part 110 while being fixed to one side of the first frame 121.

In addition, the second battery 130b may be electrically connected to the first battery 130a to provide power thereto while being mounted in the accommodation groove 123 via the holder member 151. Accordingly, the second battery 130b may serve as an auxiliary battery that supports the capacity of the first battery 130a, and may be separated from the accommodation groove 123 and replaced with a new second battery 130b when some or all of the stored power is exhausted.

Figure 3:
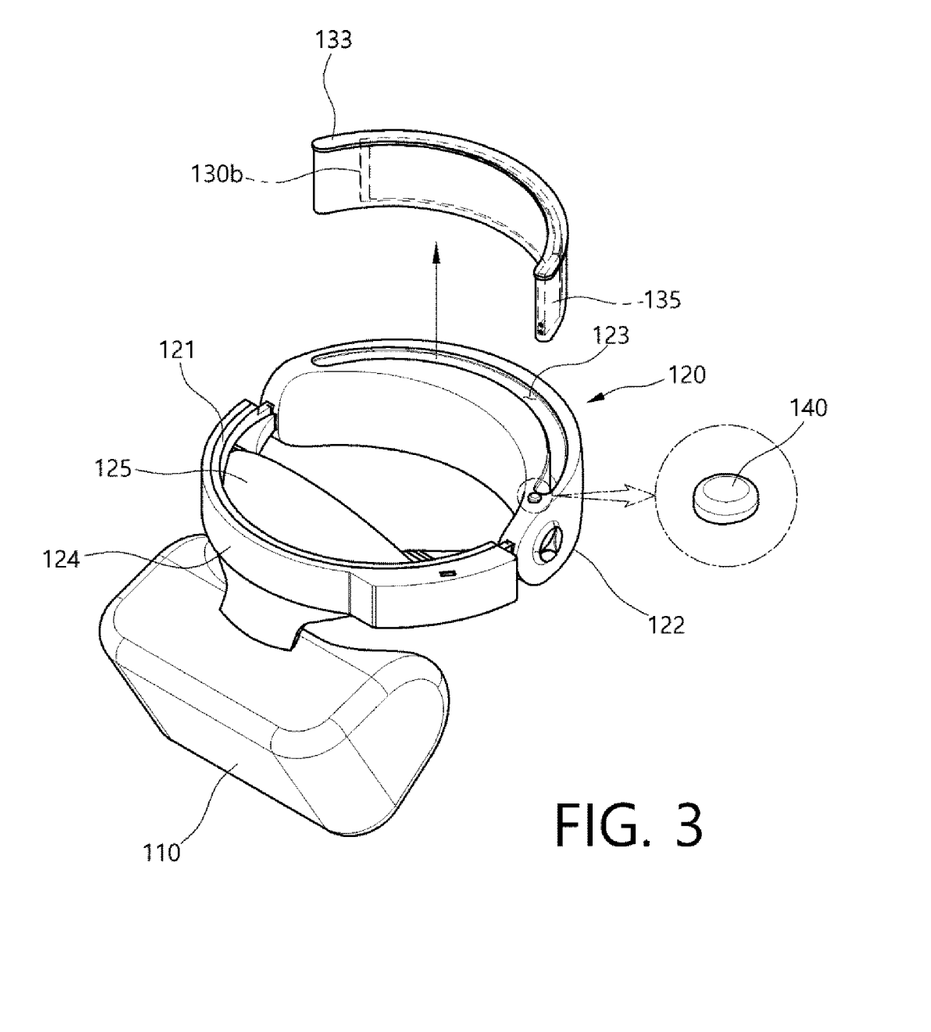
FIG. 3 is a view showing a state in which the second battery is separated from FIG. 1.
Figure 4:
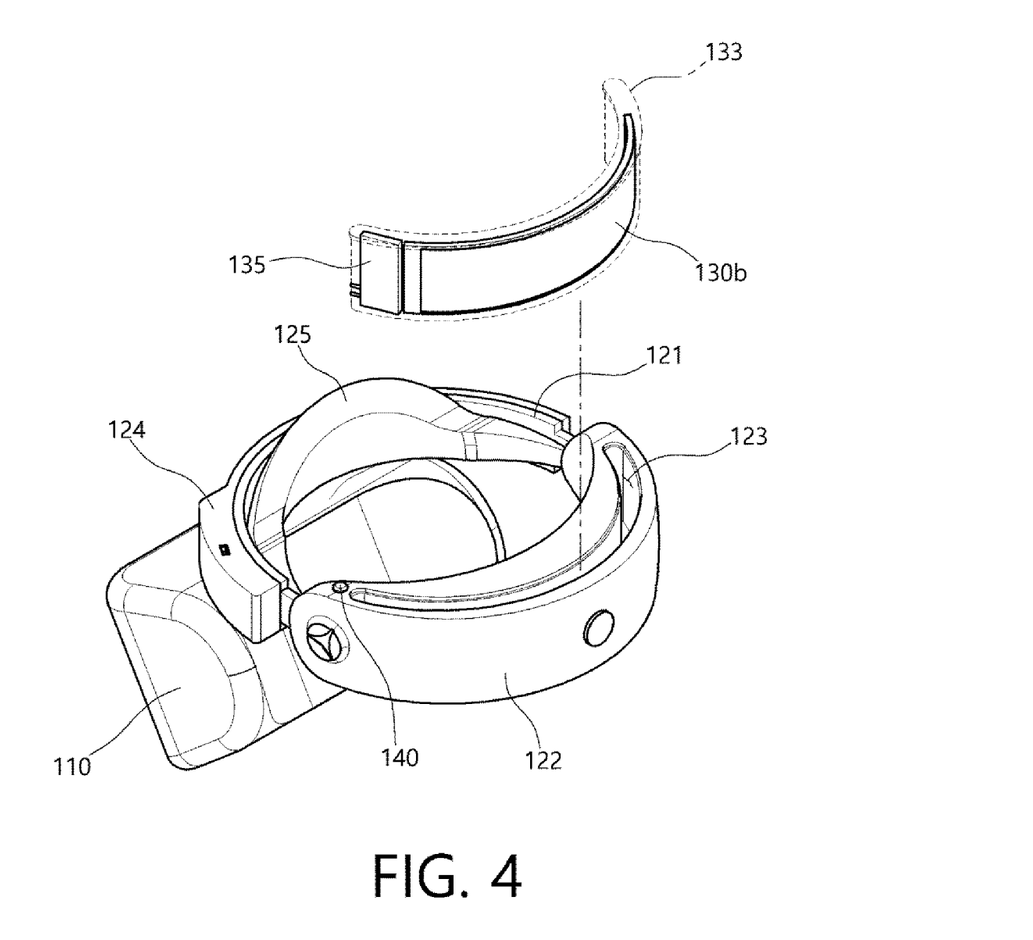
FIG. 4 is a view of FIG. 3 viewed from another direction.

That is, as shown in FIGS. 3 and 4, when the user operates the operation part 140 in case the second battery 130b mounted in the accommodation groove 123 needs to be replaced, the second battery 130b may move upward from the accommodation groove 123 in a state of being coupled to the holder member 151 so that at least a portion of the length thereof may protrude to the outside.

Accordingly, in the wearable device 100 according to an embodiment of the present invention, the second battery 130b detachably coupled to the accommodation groove 123 may function as an auxiliary battery that supplies power to the first battery 130a. Therefore, in the wearable device 100 according to an embodiment of the present invention, power may be continuously supplied to the first battery 130a through the replacement of the second battery 130b even if the power of the first battery 130a and the second battery 130b is completely exhausted.

As a result, the wearable device 100 according to an embodiment of the present invention may be continuously driven by replacing the second battery 130b, thereby increasing the use time or enabling continuous use.

Herein, the second battery 130b may supply the stored power to the first battery 130a, but may also directly supply the stored power to the body part 110 when the power of the first battery 130a is completely exhausted.

Meanwhile, the first battery 130a and the second battery 130b may be provided as a flexible battery having flexibility as described above, and the flexible battery may be a flexible plate shape having a predetermined area and length.

Accordingly, even if the first battery 130a and the second battery 130b are coupled to the first frame 121 and the second frame 122 formed in an arc shape, respectively, the first battery 130a and the second battery 130b may be changed to correspond to the shape of the first frame 121 and the second frame 122.

Specifically, the first battery 130a and the second battery 130b may be respectively coupled to the first frame 121 and the second frame 122 in a state of being bent in an arc-shape as shown in FIG. 2.

Figure 5:
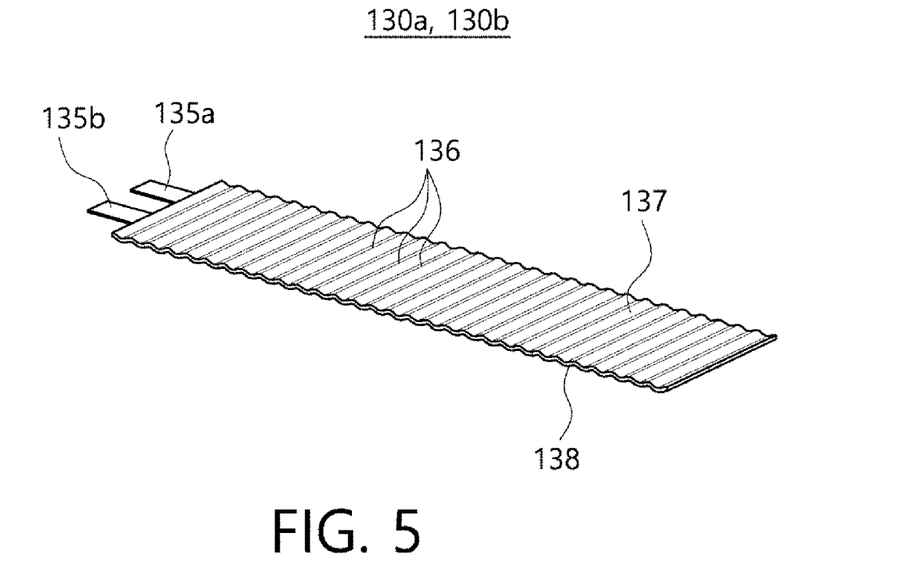
FIG. 5 is a schematic diagram showing a flexible battery that can be applied as a first battery and a second battery in a wearable device according to the present invention.
Figure 6:
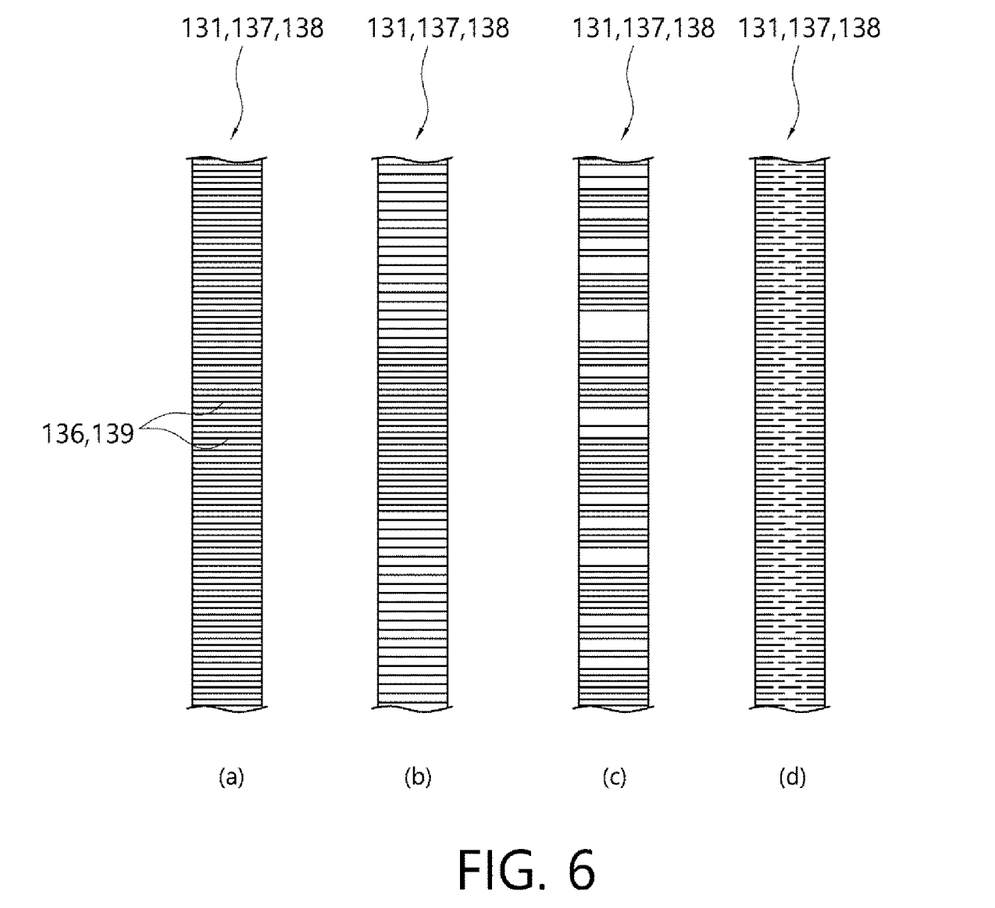
FIG. 6 is an exemplary view showing various patterns applied to the electrode assembly and the exterior material in FIG. 5, in which valley portions or mountain portions adjacent to each other are shown at various intervals.
Figure 7:
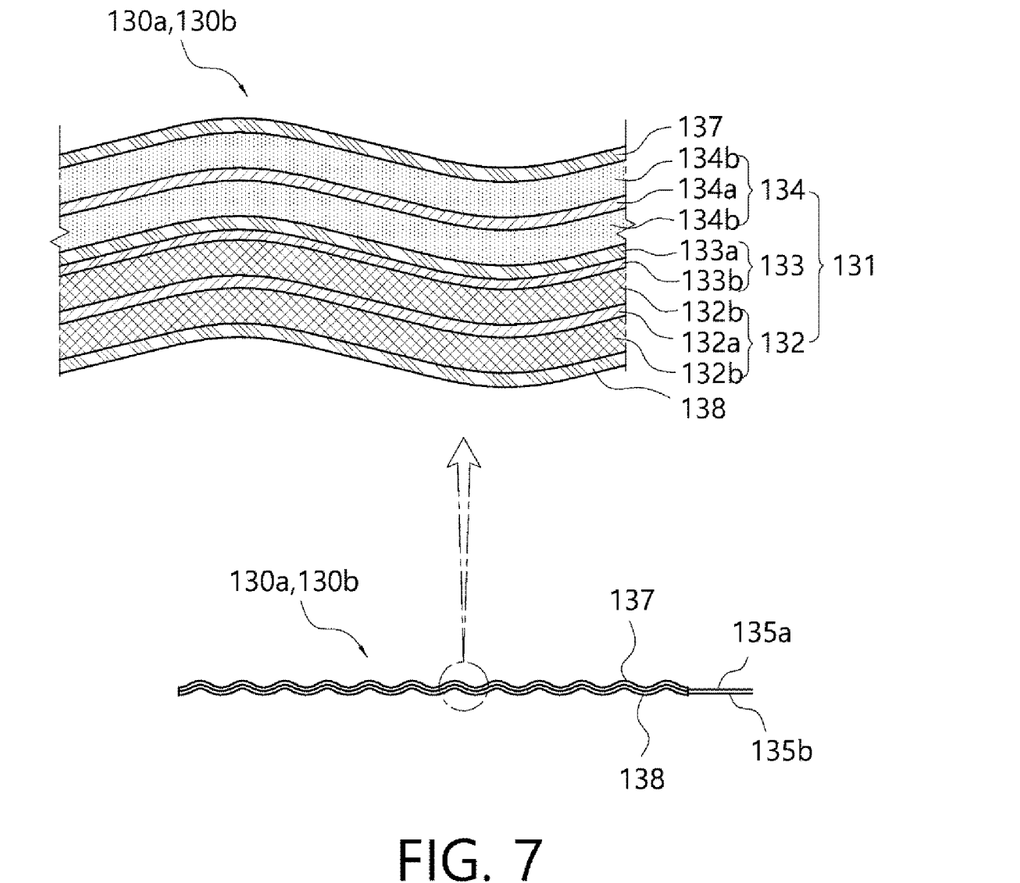
FIG. 7 is an enlarged cross-sectional view showing a detailed configuration of FIG. 5.

The first battery 130a and the second battery 130b may be in a form in which an electrode assembly 131 is encapsulated together with an electrolyte inside exterior materials 137 and 138 as shown in FIGS. 5 to 7.

In this case, each of the first battery 130a and the second battery 130b may include patterns 136 and 139 formed along the longitudinal direction of the electrode assembly 131 and the exterior materials 137 and 138, and the first pattern 136 formed in the electrode assembly 131 and the second pattern 139 formed in the exterior materials 137 and 138 may be provided to have the same directionality.

Accordingly, as shown in FIGS. 1 to 4, even though the first battery 130a and the second battery 130b are mounted in the wearing part 120 in a bent state, an amount of deformation of the base material itself constituting the electrode assembly 131 and the exterior materials 137 and 138 in the first battery 130a and the second battery 130b may be prevented or minimized through the patterns 136 and 139.

As such, even if the first battery 130a and the second battery 130b are mounted in a bent state, the amount of deformation of the base material itself that may occur at the bent portion can be minimized, whereby the electrode assembly 131 and the exterior materials 137 and 138 in the first battery 130a and the second battery 130b can be prevented from being damaged or deteriorated due to bending.

In this case, the first pattern 136 and the second pattern 139 may be respectively formed in the electrode assembly 131 and the exterior materials 137 and 138 so as to coincide with each other as well as to have the same directionality. This is to allow the first pattern 136 and the second pattern 139 to always have the same behavior.

As described above, in the first battery 130a and the second battery 130b applied to the present invention, the patterns 136 and 139 respectively formed in the electrode assembly 131 and the exterior materials 137 and 138 for the contraction and relaxation in the longitudinal direction are formed to coincide with each other, whereby the electrode assembly 131 and the exterior materials 137 and 138 may always maintain a uniform interval or contact state over the entire length even though bending in the longitudinal direction occurs.

Accordingly, even if the first battery 130a and the second battery 130b are respectively mounted in the first frame 121 and the second frame 122 in a bent state, the electrolyte packed together with the electrode assembly 131 may be uniformly distributed over the entire length, thereby preventing the performance as a battery from being deteriorated.

For example, as shown in FIG. 6(*a*) to FIG. 6(*d*), each of the first pattern 136 and the second pattern 139 may have mountain portions and valley portions formed in a direction parallel to the width direction of the electrode assembly 131 and the exterior materials 137 and 138, and the mountain portions and valley portions may be alternately disposed along the longitudinal direction of the electrode assembly 131 and the exterior materials 137 and 138.

In addition, the mountain portions and valley portions constituting the first pattern 136 and the second pattern 139 may be formed at the same positions as the mountain portions and valley portions, respectively. Accordingly, the first pattern 136 and the second pattern 139 may coincide with each other.

Specifically, the mountain portions and valley portions of the first pattern 136 and the second pattern 139 may be formed in a direction parallel to a straight line parallel to the width direction of the electrode assembly 131 and the exterior materials 137 and 138, and may be formed to be repeatedly disposed along the longitudinal direction.

In this case, the patterns 136 and 139 may be continuously or discontinuously formed in a direction parallel to the width direction of the electrode assembly 131 and the exterior materials 137 and 138. In addition, the patterns 136 and 139 may be formed over the entire length of the electrode assembly 131 and the exterior materials 137 and 138, or may be partially formed over a partial length.

Further, the mountain portions and valley portions may be provided to have various cross sections, such as an arc-shaped cross section including a semicircle, a polygonal cross section including a triangle or a quadrangle, and a cross section in which the arc-shaped cross section and the polygonal cross section are combined. In addition, each of the mountain portions and valley portions may be provided to have the same pitch and width, but may also be provided to have different pitches and widths.

Accordingly, the first battery 130a and the second battery 130b may reduce fatigue applied to the base material itself through the patterns 136 and 139 even though the electrode assembly 131 and the exterior materials 137 and 138 are embedded in the wearing part 120 in a bent state, thereby preventing the battery from being damaged or deteriorating in performance as a battery.

Meanwhile, the first pattern 136 and the second pattern 139 may be provided so that intervals between adjacent mountain portions or between adjacent valley portions are formed at the same distance, different distances, or a combination thereof.

The electrode assembly 131 may be encapsulated together with the electrolyte inside the exterior materials 137 and 138. As shown in FIG. 7, the electrode assembly 131 may include a positive electrode 132, a negative electrode 134, and a separator 133.

The positive electrode 132 may include a positive electrode current collector 132a and a positive electrode active material 132b, the negative electrode 134 may include a negative electrode current collector 134a and a negative electrode active material 134b, and each of the positive electrode current collector 132a and the negative electrode current collector 134a may be implemented in the form of a plate-shaped sheet having a predetermined area.

That is, the positive electrode 132 and the negative electrode 134 may have active materials 132b and 134b compressed, deposited or applied on one or both surfaces of the current collectors 132a and 134a, respectively. In this case, the active materials 132b and 134b may be provided over the entire area of the current collectors 132a and 134a, respectively, or may be provided partially over a partial area thereof.

Further, the positive electrode current collector 132a and the negative electrode current collector 134a may include a negative electrode terminal 135a and a positive electrode terminal 135b for electrical connection to an external device, respectively.

Herein, the positive electrode terminal 135b and the negative electrode terminal 135a may be provided to extend from the positive electrode current collector 132a and the negative electrode current collector 134a, respectively, by a predetermined length to protrude from one sides of the exterior materials 137 and 138, or to be exposed on the surfaces of the exterior materials 137 and 138.

In this case, the positive electrode active material 132b and the negative electrode active material 134b may include a polytetrafluoroethylene (PTFE) ingredient. Accordingly, even if the first battery 130a and the second battery 130b are bent, the positive electrode active material 132b and the negative electrode active material 134b may be prevented from peeling off from the current collectors 132a and 134a, respectively, or from cracking due to the bending.

Meanwhile, the separator 133 disposed between the positive electrode 132 and the negative electrode 134 may include a nanofiber web layer 151b disposed on one or both surfaces of a non-woven fabric layer 151a.

Herein, the nanofiber web layer 151b may be a nanofiber containing at least one selected from a polyacrylonitrile nanofiber and a polyvinylidene fluoride nanofiber.

The exterior materials 137 and 138 may be formed of a plate-shaped member having a predetermined area, and may protect the electrode assembly 131 from an external force by accommodating the electrode assembly 131 and the electrolyte therein.

As an example, the exterior materials 137 and 138 may include a pair of first exterior material 137 and second exterior material 138, and the pair of first exterior materials 137 and second exterior materials 138 may be sealed with an adhesive on the edges abutting each other. Accordingly, the electrolyte and electrode assembly 131 accommodated inside the exterior materials 137 and 138 may be prevented from being exposed to the outside, and the electrolyte may be prevented from leaking to the outside.

In the exterior materials 137 and 138, the first exterior material 137 and the second exterior material 138 may be formed of two members, and all edges of the first exterior material 137 and the second exterior material 138 constituting a sealing portion may be sealed withe an adhesive.

Alternatively, the first exterior material 137 and the second exterior material 138 may be formed of one member and folded in half along a width direction or a longitudinal direction thereof, and the remaining edge portions of the first exterior material 137 and the second exterior material 138 abutting each other may be sealed with an adhesive.

Meanwhile, the wearable devices 100 according to the present invention may be implemented in a form that serves as both an augmented reality function and a virtual reality function, may be a form in which the augmented reality function and the virtual reality function are integrated, or may display information linked with a smartphone on the display unit 112.

In addition, when the wearable device 100 according to the present invention is implemented as a virtual reality device, a smartphone having a virtual reality function may be detachably coupled to the body part 110. In this case, the display unit 112 included in the body part 110 may be omitted, and the smartphone coupled to the body part 110 may replace the display unit 112.

Although an embodiment of the present invention have been described above, the spirit of the present invention is not limited to the embodiment presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

The invention claimed is:

1. A wearable device comprising:
   a body part including a display unit for augmented reality or virtual reality;
   a wearing part for maintaining a worn state of the body part so that the display unit can be disposed in front of a user's face;
   a battery part coupled to the wearing part, and including a first battery serving as a main battery providing driving power to the body part and a second battery serving as an auxiliary battery supplementing the first battery; and
   an operation part provided in the wearing part to allow the second battery to be separated from the wearing part when operated by the user,
   wherein the wearing part comprises a frame having a ring shape to surround the user's head,
   wherein the frame comprises:
   an arc-shaped first frame having one side connected to the body part, and to which the first battery is coupled; and
   an arc-shaped second frame, each end of which is respectively fastened to a corresponding end of the arc-shaped first frame,
   wherein the operation part is disposed in the arc-shaped second frame, and
   wherein the arc-shaped second frame comprises an accommodation groove configured to accommodate the second battery.

2. The wearable device of claim 1, wherein the wearable device further includes a holder member in which the second battery is embedded, and
   wherein the holder member is detachably coupled to the accommodation groove.

3. The wearable device of claim 1, wherein the wearable device further includes a cover member coupled to the arc-shaped first frame to protect the first battery disposed on one surface of the arc-shaped first frame from an external environment.

4. The wearable device of claim 1, wherein the body part does not include a battery for driving power.

5. The wearable device of claim 1, wherein the wearing part further includes a plate-shaped support member coupled to the arc-shaped first frame, and wherein the support member is formed in a curved surface having a predetermined area to partially surround the user's head.

6. The wearable device of claim 1, wherein each of the first battery and the second battery is a flexible battery having flexibility.

7. The wearable device according to claim 6, wherein the flexible battery includes:
   an electrode assembly;
   an exterior material to encapsulate the electrode assembly together with an electrolyte;
   a first pattern formed in the electrode assembly such that mountain portions and valley portions are repeatedly arranged along the longitudinal direction of the electrode assembly; and
   a second pattern formed in the exterior material to coincide with the first pattern along the longitudinal direction of the exterior material.

\* \* \* \* \*